P. E. FELLOWS.
TIRE CHAIN CONNECTION.
APPLICATION FILED MAR. 25, 1920.
1,368,030.
Patented Feb. 8, 1921.
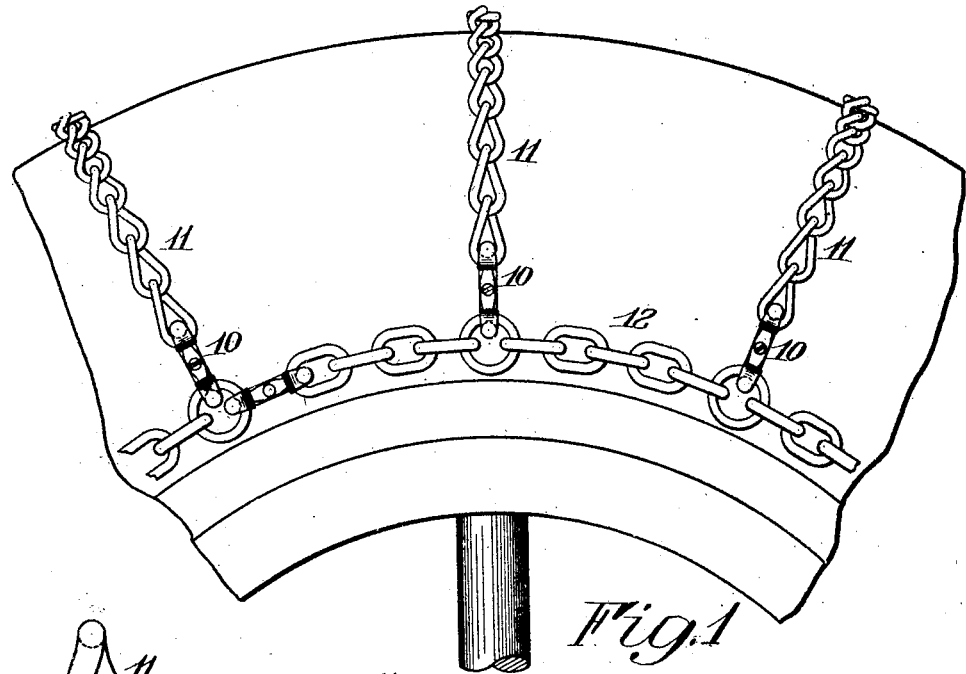
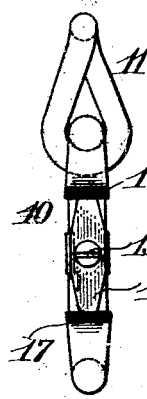
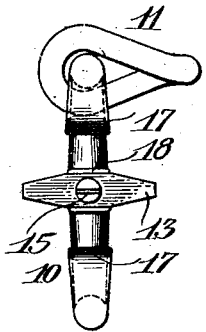
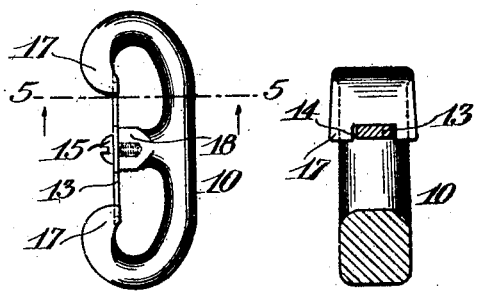
Fig.2  Fig.3  Fig.4  Fig.5
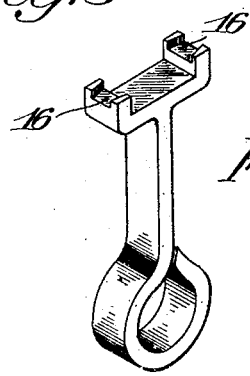
Fig.6
INVENTOR
Perry E. Fellows
BY
Frederick S. Church
his ATTORNEY

UNITED STATES PATENT OFFICE.

PERRY E. FELLOWS, OF ROCHESTER, NEW YORK.

TIRE-CHAIN CONNECTION.

1,368,030.

Specification of Letters Patent.

Patented Feb. 8, 1921.

Application filed March 25, 1920. Serial No. 368,621.

*To all whom it may concern:*

Be it known that I, PERRY E. FELLOWS, a citizen of the United States, residing at Rochester, in the county of Monroe and State of New York, have invented certain new and useful Improvements in Tire-Chain Connections; and I do hereby declare the following to be a full, clear, and exact description of the same, reference being had to the accompanying drawings, forming a part of the specification, and to the reference numerals marked thereon.

This invention relates to the connection of anti-skid chains on tires which are removable. One object of this invention is to provide a readily detachable connection between links of a chain.

A further object of the present invention resides in the provision of a readily detachable link inserted in anti-skid chains.

Another object of this invention is the provision of a link between the usual cross and side chains which is not capable of disconnection from the cross chains when the parts are in their usual operative position, but which may with facility be removed when the adjacent link of the cross chain is turned at right angles relative to the plane of the detachable link whereby with the usual amount of play or looseness in the chains a cross chain may be readily removed for replacement without taking off any but the particular cross chain to be replaced.

To these and other ends the invention consists in certain improvements and combinations of parts, all as will be hereinafter more fully described, the novel features being pointed out in the claims at the end of the specification.

In the drawings:

Figure 1 is a view of a portion of a tire having the cross chains connected by means of the improved link.

Fig. 2 represents a plan view with the keeper closed.

Fig. 3 is the same as Fig. 2, except that the keeper is open and the link is ready to be detached.

Fig. 4 is a side view of the link shown by Figs. 2 and 3.

Fig. 5 is a section on the line 5—5 of Fig. 4.

Fig. 6 shows a tool or spanner for opening the link.

Similar reference characters throughout the several views indicate the same parts.

Referring to Fig. 1, it will be seen that the connecting link is shown at 10 attached at one end to the cross chain 11, and at the other end with the side chain 12. Only one endless element or link 11 of the cross chain is shown in Figs. 2 and 3 attached to the detachable link 10. As shown in Figs. 4 and 5 the detachable link 10 is formed in the shape illustrated and may be of any suitable material, but preferably is of malleable iron. A keeper or guard 13 is provided for the link 10 which may be provided with tapered ends to fit in the grooves 14 on the inner or under side of the bent over portion of the hook, shown best by Fig. 5. The tapering of the ends of the keeper also render it sufficiently resilient to allow the ends to be bent to enter the grooves 14. An upstanding lug 18 is formed integrally with the hook shaped ends and located between them and is used to afford a seat or mounting for the keeper 13. A screw 15 affords a pivotal mounting for the keeper but it will be understood that any other suitable means for providing a pivotal mounting may be used. Since the link 10 and guard 13 are not of such size and material as to be directly manipulated by the hands, a tool or spanner shown in Fig. 6, is provided to facilitate the opening and closing of the link 10. The tool shown in Fig. 6 spans the pivot center of the keeper and engages the keeper near its ends in the grooves 16 which are tapered to fit the keeper.

An important feature of the invention resides in making the bent over or free end portions 17 of the hooks shown in Figs. 2 to 5 and shown best in Fig. 5, wider than the main body portion of the link 10, and also wider than any lateral dimension of the opening in the link 11. That is, with the links 10 and 11 in the position shown in Fig. 2 with their axes in the plane of the link 10, it will be impossible to detach the link 11 when the keeper 13 is opened and the axes of the two links still in the same plane of the link 10, because the maximum width of the opening in the link 11 measured at right angles to the longitudinal axis is not sufficient to go over broad portion 17. This important feature affords a further safe guard against the links coming apart accidentally. In order to separate the links 10 and 11 it is necessary to move the link 11 until its longitudinal axis is at right angles to that of the link 10 when the longitudinal dimension of the opening in the link 11 is sufficient to allow the link 11 to be detached from the link 10 over the broadened portion 17 as shown in Fig. 3. This last explanation indicates that the link 10 is not capable of use as an ordinary snap link, but that it is particularly adapted for use with the usual form of link used in the cross chains for a tire, because these links by their shape are particularly adapted for coöperation with the link of the present invention. Usually there is sufficient looseness or play in the tire chains to enable the link 10 to be turned at right angles to link 11 for detaching the cross chains. This simple means of disconnection does away with the necessary bending operations which are usually involved in the attachment of the cross chains and make them more readily removable. Although it has been stated that the links must be turned at right angles to one another, it will be appreciated that any substantial relative movement of the links in this direction will be included by the present invention, rather than a movement through precisely ninety degrees.

I claim as my invention:

1. A tire chain comprising side and cross chains and a link connecting said side and cross chains, said link having similarly shaped bent over ends gradually formed wider than its main body portion whereby the cross chains may be detached only by relative movement of the axis of the adjacent link of the cross chain to form substantially a right angle with the plane of the detachable link, the ends of said link being of the same height and affording the same clearance from the main body portion.

2. A detachable connecting device having free ends bent over to form hook portions, the free ends of the bent over portions being wider than the main body portion of the connecting device, a keeper pivotally mounted between the bent over portions and adapted to bridge the free ends of the bent over portions of the hooks, said keeper when in bridging position fitting in grooves on the inner side of the bent over portions of the hooks.

3. A link having gradually enlarged ends adapted for attachment to another link and separable from said other link only when said other link has its longitudinal axis turned through substantially a right angle with respect to the plane of the first mentioned link, the first mentioned link being gradually enlarged between its ends and in the same direction as the enlargement of the ends.

4. A detachable connecting link comprising similarly shaped bent over end portions of gradually increasing width provided with grooves on the under side thereof, an upstanding lug extending upwardly as far as the bottom of said bent over end portions located between said end portions and provided with a substantially flat bearing surface thereon, and a resilient keeper pivotally secured on the upstanding lug and adapted to engage the grooves in the under side of said end portions, the ends of said keeper being tapered to facilitate the flexure necessary to engage said grooves.

5. A detachable connecting device having similarly shaped free ends bent over to form hook portions, the free ends of the bent over portions being of gradually increasing width relative to the main body portion, a link adapted to be detached or secured to the connecting device only by movement thereof through substantially 90 degrees relative to the normal coöperating position of the connecting device and link when their axes are in alinement.

PERRY E. FELLOWS.